United States Patent
Beihl

[11] Patent Number: 5,961,062
[45] Date of Patent: Oct. 5, 1999

[54] RETAINING CORDS

[76] Inventor: Amanda Herbst Beihl, 8277 Carvel Dr., Colorado Springs, Colo. 80920

[21] Appl. No.: 09/083,256

[22] Filed: May 21, 1998

[51] Int. Cl.[6] ................................................. B65H 75/38
[52] U.S. Cl. .................. 242/400.1; 242/577; 242/588.6; 242/129; 206/702; 191/12 R
[58] Field of Search ............................. 242/400.1, 405.2, 242/405.1, 401, 577, 577.3, 577.4, 127, 129, 588.6; 224/162; 191/12 R, 12.2 R; 206/702, 388; 439/501

[56] References Cited

U.S. PATENT DOCUMENTS

| | | | |
|---|---|---|---|
| D. 275,175 | 8/1984 | Rolli, Jr. | D8/356 |
| D. 336,421 | 6/1993 | Grubicy et al. | D8/356 |
| D. 340,695 | 10/1993 | Merriman et al. | D13/154 |
| D. 353,990 | 1/1995 | Alfreds | D8/356 |
| D. 374,815 | 10/1996 | Snow | D8/394 |
| D. 380,585 | 7/1997 | Olson | D8/382 |
| 502,373 | 8/1893 | Munslow | 242/577.4 |
| 1,036,008 | 8/1912 | Roeder | 242/577.4 |
| 2,138,299 | 11/1938 | Gruebel | 242/127 |
| 2,479,415 | 8/1949 | Sarlo | 242/577 |
| 2,517,723 | 8/1950 | Schoditsch | 242/577.3 |
| 4,665,590 | 5/1987 | Udelhofen | 24/115 H |
| 4,687,154 | 8/1987 | Deweese | 242/405.2 |
| 4,768,974 | 9/1988 | Cowen et al. | 439/371 |
| 4,895,249 | 1/1990 | Davis et al. | 206/388 |
| 4,910,835 | 3/1990 | Carpenter | 24/129 R |
| 4,940,859 | 7/1990 | Peterson | 191/12.4 |
| 4,944,694 | 7/1990 | Dorn | 439/501 |
| 5,048,158 | 9/1991 | Koerner | 24/16 R |
| 5,224,245 | 7/1993 | Matoba | 24/115 G |
| 5,328,384 | 7/1994 | Magnuson | 439/369 |
| 5,457,600 | 10/1995 | Campbell et al. | 361/643 |
| 5,471,713 | 12/1995 | Alter et al. | 24/136 R |
| 5,497,880 | 3/1996 | Dieffenbach | 206/702 |
| 5,628,646 | 5/1997 | Voss | 439/369 |
| 5,629,826 | 5/1997 | Roca et al. | 361/118 |

*Primary Examiner*—John M. Jillions
*Attorney, Agent, or Firm*—Linda Flewellen Gould

[57] ABSTRACT

A method of neatly retaining cords, such as electrical cords, in a box, such as a surge protector, utilizes a brace member and two inverted-L-shaped members. The brace member can be mounted on the bottom of the box, so that the two inverted-L-shaped members extend upwards from the bottom of the box. A cord can then be neatly wrapped around the two inverted-L-shaped members, with the horizontal prong of each inverted-L-shaped member holding the cord in place so that it does not uncoil. One of the inverted-L-shaped members is movable along the brace member, to properly accommodate various lengths of cord. Multiple cord retainers may be mounted in a surge protector or other power cord box, each one suitable for neatly retaining a separate electrical cord.

9 Claims, 2 Drawing Sheets

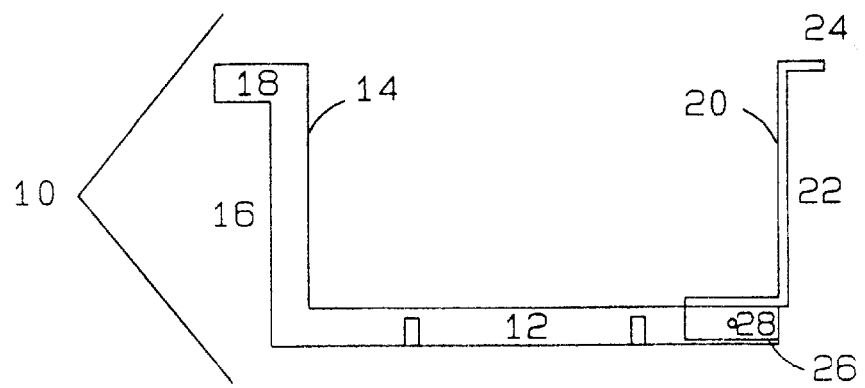
FIGURE 1
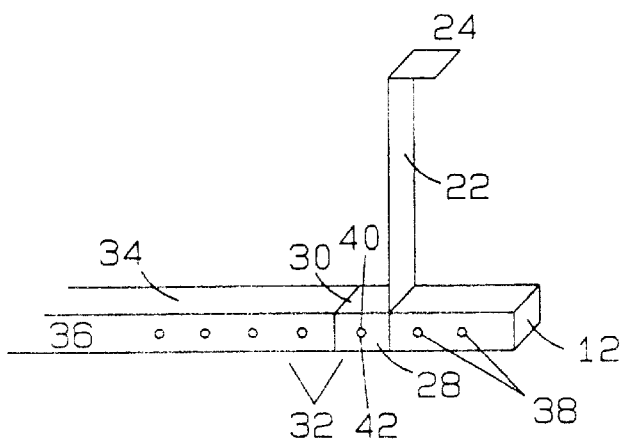
FIGURE 3
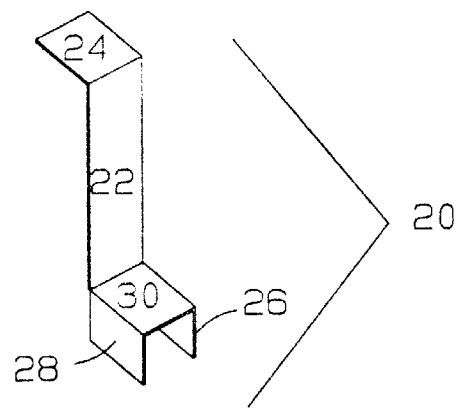
FIGURE 2
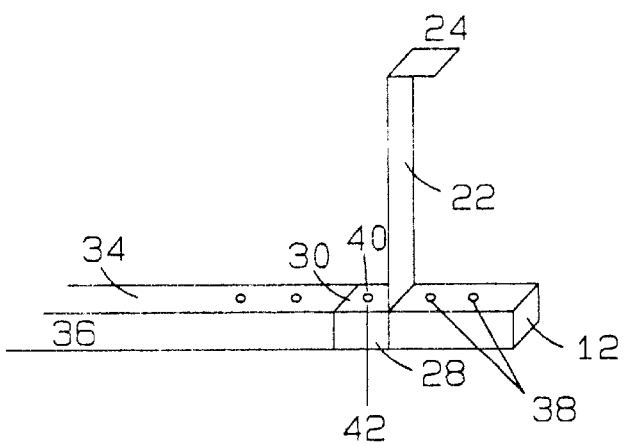
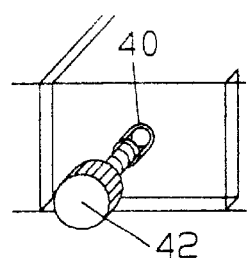
FIGURE 6
FIGURE 4

RETAINING CORDS

1.0 BACKGROUND OF THE INVENTION

1.1 Technical Field

This invention pertains to a method and apparatus for neatly retaining cords, such as electrical cords, within a box, such as a surge protector. One or more cord retainers can be mounted in a box, so that individual cords can be wound around a cord retainer to organize those cords in an orderly manner.

1.2 Background Art

In many homes and offices, spider-web-like mazes of electrical and telephone cords create unsightly messes. These cords frequently accompany computer equipment, such as a common office desk arrangement including a CPU, monitor, modem, printer, and other peripherals. Similarly, many homes have an entertainment center including a television, stereo, compact disc player, speakers, and other sound equipment, all of which have various cords which seem to be predisposed to tangling. When it is necessary to service or replace one of these related devices, interweaving of the cords may make it difficult to disconnect and remove the desired device. A number of different types of cords may be involved, including power cords from each electrical device, speaker wires, or other line cords such as cords running from a modem or telephone to a wall jack, all of which will generally be referred to in this Specification as "cords".

A number of devices are known in the prior art which are suitable for retaining cords to eliminate tangled exposed cords. For example, United States Design Pat. Nos. 336,421 to Grubicy et al. and 374,815 to Snow describe hand held cord retainers around which cords can be wrapped. Although Grubicy appears to have a mechanism for accommodating various lengths of cord, the mechanism consists of multiple hooks permanently arranged in a row, where adjacent hooks would hinder wrapping a cord on a chosen hook. Snow does not seem to have an adjustment mechanism for accommodating differing lengths of cord.

Other cord retaining devices known in the prior art include U.S. Pat. Nos. 5,628,646 to Voss, 5,471,713 to Alter et al., 5,048,158 to Koerner, Design 275,175 to Rolli, Jr., Des. 380,585 to Olson, Des. No. 340,695 to Merriman et al, Des. 353,990 to Alfreds, U.S. Pat. Nos. 4,910,835 to Carpenter, 4,768,974 to Cowan et al., 4,665,590 to Udelhofen et al., 5,224,245 to Matoba, 5,328,384 to Magnuson, 4,940,859 to Peterson, and 5,629,826 to Roca et al. While these patents represent devices which are useful for their intended purpose, none adequately permits different lengths of cord to be easily retained and easily released.

It is common to connect cords from various related electrical appliances to a surge protector, which protects the appliances from damage due to surges of current or voltage from the power source. An example of such a surge protector is found in U.S. Pat. No. 5,457,600 to Campbell, et al. The Campbell surge protector box includes bays within the box suitable for holding excess cords, once the plug of each cord is plugged into a surge protection circuit at the front of the box. However, these multiple cords may easily uncoil or become intertwined within the box. An electric cord take-up device shown in U.S. Pat. No. 4,944,694 to Dorn does provide pegs within a box for holding wrapped cord, but the cord can easily unwrap, particularly when the box is opened.

Boxes suitable for holding multiple cords, such as surge protectors and extension cords with a bay to contain various lengths of excess cord, are a significant improvement over open faced surge protectors, which can leave various lengths of cords tangled in a spider-web-like maze on the floor. But although such boxes are capable of removing from sight the tangled cords, these boxes can be made significantly neater, resulting in each cord being easier to access, by the use of a cord retaining method described in this Specification.

2. DISCLOSURE OF THE INVENTION

2.1 Summary of the Invention

An object of this invention is to neatly secure individual cords within a box, such as a surge protector or extension cord box, so that each cord is not tangled with cords from near-by appliances.

Another object of this invention is to secure such individual cords in a manner which enables each such cord to be easily removed without disturbing cords from near-by appliances.

Yet another object of this invention is to provide a method of neatly securing cords so that any excess portions of the cord, not needed to reach from the appliance to a wall outlet, surge protector, or extension cord as the case may be, can be wound into a neat coil, regardless of the length of that excess cord.

In many settings multiple cords from various appliances exist in close proximity, due to the close proximity of the various devices from which the cords emanate. Such cords are generally made sufficiently long to reach across a room to a wall outlet, but sometimes extension cords are utilized to reach a desired outlet. Because the actual length of cord is rarely the exact length required to traverse the distance to the desired outlet, excess cord tends to reside in unsightly messes, and frequently becomes tangled with adjacent cords. Such tangles can become a hazard, as a person tripping on any one of the cords may lead to pulling multiple appliances off shelves or desks.

To decrease the hazard and unattractiveness of such tangled cords, it is desirable to hide the cords within a box. The box may be simply an empty box suitable for holding portions of various cords, or may serve some other purpose such as providing a surge protection circuit or an extension cord for multiple appliances. Typically, a surge protector or extension cord box contain at least one electrical receptacle to which a power plug of a power cord of an electrical apparatus may be connected, and a bay in which excess cord may be placed. Although placing various portions of cords within the box lessens the messiness of such cords, tangled messes still easily result within the box. It may be even more difficult to extricate a cord from a tangled group of cords within a box than it would be to remove the cord from a group of cords lying on a floor. Nevertheless, it is necessary to so extricate an individual cord from time to time when the appliance to which that cord is attached needs servicing or moving.

The method of retaining cords according to the present invention involves a brace member suitable for connecting to the bottom of a box, with two inverted-L-shaped members connected to that brace. Once the brace member is connected to the bottom of a surge protector or other box, the inverted-L-shaped members provide a convenient form onto which excess cord can be wound. Each inverted-L-shaped member includes one substantially vertical leg extending up from the brace member, and one substantially horizontal leg extending generally at a right angle to the vertical legs. These horizontal legs extend in opposite directions, so that a cord wound around the two inverted-L-shaped members is restrained from moving upwards and unwinding by the horizontal legs.

Although one inverted-L-shaped member can be permanently attached to the brace member, it is useful for the second inverted-L-shaped member to be movable. By making the movable inverted-L-shaped member slidable along the brace member, the distance between the two inverted-L-shaped members can be varied, to accommodate differing lengths of excess cord. The mobility of the second inverted-L-shaped member serves a second purpose: when it is desirable to remove an individual cord from the box in which it is held to enable servicing or moving of the appliance from which that cord emanates, the movable inverted-L-shaped member can be advantageously moved toward the first inverted-L-shaped member, thus releasing the cord and allowing for ease of removal.

To enable the movable inverted-L-shaped member to slide along the brace member, an inverted-U-shaped member can conveniently be attached to one end of the vertical leg of that inverted-L-shaped member, opposite the horizontal leg. If the inverted-L-shaped member is made of metal, then the apex of the inverted-U-shaped member can advantageously be welded to the tip of the vertical leg, but other means of connecting the inverted-U-shaped member to the inverted-L-shaped member are possible and useful. If the brace member is a rectangular prism, then the inverted-U-shaped member can slide along the brace member, with the apex of the inverted-U-shaped member adjacent to the top panel of the brace member, and each prong of the inverted-U-shaped member adjacent to opposite sides of the brace member.

A securing means is needed to hold the movable inverted-L-shaped member in a chosen location along the brace member, suitable for holding a particular length of excess cord. This securing means may conveniently consist of a screw or peg inserted in a hole in one prong of the inverted-U-shaped member, to contact the brace member, or to be inserted into a hole in the brace member. Multiple holes may be provided in the brace member to align with the hole in the inverted-U-shaped member to accommodate securing the movable inverted-L-shaped member in various positions along the brace member.

The novel features that are considered characteristic of the invention are set forth with particularity in the claims. The invention itself, both as to its construction and its method of operation, together with additional objects and advantages thereof, will best be understood from the description of specific embodiments which follows, when read in conjunction with the accompanying drawings.

2.2 BRIEF DESCRIPTION OF THE DRAWINGS

FIG. 1 is a side view of a cord retainer, according to the present invention.

FIG. 2 is a perspective view of a movable inverted-L-shaped member of a cord retainer, according to the present invention.

FIG. 3 is a perspective view of a securing means utilized in a cord retainer according to the present invention.

FIG. 4 is a perspective view of another possible securing means utilized in a cord retainer according to the present invention.

FIG. 6 is a perspective view of a portion of a securing means utilized in a cord retainer according to the present invention.

2.3 DETAILED DESCRIPTION OF THE PREFERRED EMBODIMENT

Figure 5:
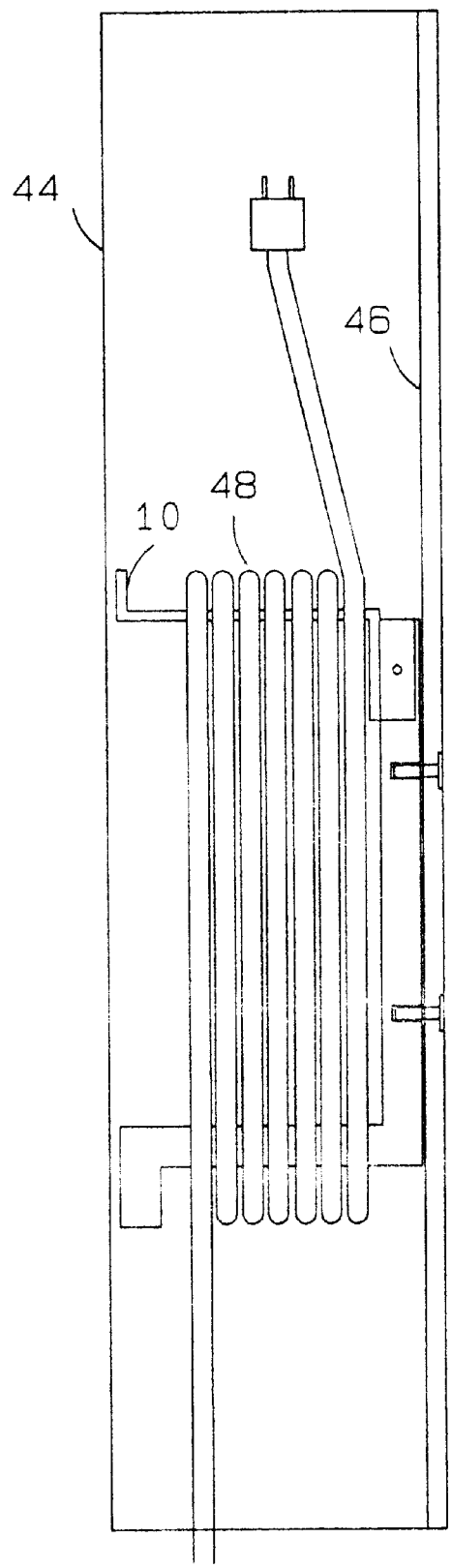
FIG. 5 is a side view of a cord retainer according to the present invention, mounted in a box containing at least one power cord.

The present invention involves a method of retaining cords from multiple appliances, to prevent tangling of those cords. In the following description, numerous specific details are set forth, in order to provide a thorough understanding of the present invention. It will be obvious, however, to one skilled in the art that the present invention may be practiced without these specific details. Some well-known methods and structure have not been set forth in order not to unnecessarily obscure the description of the present invention.

The method of retaining cords of the present invention can be better understood by reference to FIG. 1. A cord retainer 10 includes a brace member 12, and two inverted-L-shaped members 14 and 20. Each of these components can conveniently be made of metal, plastic, or some other rigid material. The brace member 12 can be fashioned in a variety of shapes, including the rectangular prism shown in FIGS. 1, 3, and 4. Other shapes, such as an elongated semi-circle shape with flat bottom, are possible for brace member 12. One inverted-L-shaped member 14 can be permanently attached to the brace member 12, either at an end of the brace member 12 or at some other location along the brace member 12. The fixed inverted-L-shaped member 14 can be attached to the brace member 12 by welding, or by being formed together in the same mold, or by some other convenient method.

The other inverted-L-shaped member 20 is movable, and can slide along the brace member 12 to be secured at one of a number of possible locations. Ideally, the location selected for movable inverted-L-shaped member 20 will enable a cord 48 to be neatly coiled around the cord retainer 10 within a box 44, without any further excess that will not fit around the cord retainer 10, as shown in FIG. 5.

The brace member 12 can be attached to a bottom panel 46 of a box 44, where the box is a surge protector, an extension cord box, or simply an otherwise empty box suitable for holding one or more cords, as shown in FIG. 5. When the brace member 12 is attached to the box 44, each inverted-L-shaped member 14, 20 extends upwards from the bottom panel 46 of the box 44. The fixed inverted-L-shaped member 14 has two legs, and when the brace member 12 is attached to the box, those legs comprise a substantially vertical leg 16 and a substantially horizontal leg 18. The horizontal leg 18 points away from the movable inverted-L-shaped member 20, as shown in FIG. 1.

Numerous methods of attaching the movable inverted-L-shaped member 20 to the brace member 12 are possible. For example, it would be possible to attach a plate to movable inverted-L-shaped member 20, at the end of vertical leg 22, opposite horizontal leg 24, and then secure the inverted-L-shaped member 20 to the brace member 12 by nailing, stapling, or screwing through the plate to the brace member 12 when the movable inverted-L-shaped member 20 is in a desired location along the brace member 12. In the preferred embodiment shown in FIGS. 1–4, an inverted-U-shaped bracket 26 is attached to the inverted-L-shaped member 20 at the end of vertical leg 22 which is opposite horizontal leg 24. As best shown in FIG. 2, the inverted-U-shaped bracket 26 consists of an apex 30 and two prongs 28. The width of the apex 30 should be sufficient to contact the top panel 34 of brace member 12, slightly extending past each side of that top panel 34 so that the prongs 28 of the inverted-U-shaped bracket 26 extend downwards adjacent to the side panels 36 of the brace member 12. In this manner, the movable inverted-L-shaped member 20 can slide along the brace member 12 without restriction until a securing means 32 is used to secure the movable inverted-L-shaped member 20 in a chosen location suitable for winding a particular length of cord around inverted-L-shaped members 14, 20. The inverted-U-shaped bracket 26 provides stability so that the movable inverted-L-shaped member 20 cannot be easily displaced from the brace member 12 as it is moved along the brace member 12 to find an ideal position for a particular cord 48. It is possible to form the apex 30 in a number of different lengths, provided such lengths are less than the length of the brace member 12, and to attach the vertical leg 22 to the apex 30 anywhere on that apex 30.

Once a desired distance between inverted-L-shaped members 14, 20 for a particular length of cord 48 is determined, movable inverted-L-shaped member 20 should be secured in that corresponding location along brace member 12 by a securing means 32. FIGS. 3 and 4 illustrate two viable methods of securing the movable inverted-L-shaped member 20. In FIG. 3, a hole 40 is formed in a prong 28 of the inverted-U-shaped bracket 26, suitable for receiving a nail, peg, or screw 42, each of which will be generally referred to herein as a pin. The pin 42 may be driven through the hole 40 to engage the brace member 12, simply to create a pressure fit or to be further inserted into a hole 38 formed in brace member 12. Numerous holes 38 can be formed in a side panel 36 of brace member 12, as shown in FIG. 3, to receive the pin 42 in a number of possible chosen locations for movable inverted-L-shaped member 20.

Similarly, FIG. 4 demonstrates a securing means 32 in which a hole 40 is formed in the apex 30 of inverted-U-shaped bracket 26. A nail, peg, or screw 42 can be inserted into that hole 40, as shown in FIG. 6, to engage the top panel 34 of brace member 12, or can be further inserted into holes 38 formed in that top panel 34. The securing means 32 shown in FIG. 4 has the advantage of being easily accessible by a screwdriver from above the cord retainer 10 even when the cord retainer 10 is installed in a confined area within a box 44.

The invention has been described in detail with particular reference to preferred embodiments thereof. As will be apparent to those skilled in the art in the light of the accompanying disclosure, many alterations, substitutions, modifications, and variations are possible in the practice of the invention without departing from the spirit and scope of the invention.

I claim:

1. A cord retainer for mounting within a box, comprising:
   a. brace member connectable to a bottom panel of said box,
   b. fixed inverted-L-shaped member connected to said brace member, having two legs substantially at right angles to each other, so that a substantially vertical leg extends upwards from said brace member when the brace member is connected to said bottom panel, and a substantially horizontal leg extends outward from said substantially vertical leg in a fixed direction,
   c. movable inverted-L-shaped member slideably connected to said brace member, having two movable legs substantially at right angles to each other, so that a substantially vertical movable leg extends upwards from said brace member when the brace member is connected to said bottom panel, and a substantially horizontal movable leg extends outward from said substantially vertical movable leg, in a direction opposite said fixed direction, and
   d. securing means for securing said movable inverted-L-shaped member in a chosen position on said brace member.

2. A cord retainer as described in claim 1, wherein:
   a. said brace member comprises a rectangular prism, having a top panel, a bottom panel adjacent to said bottom panel of said box, and four side panels, and
   b. said movable inverted-L-shaped member further comprises an inverted-U-shaped bracket connected to said substantially vertical movable leg at an end of said substantially vertical movable leg opposite said substantially horizontal movable leg, said inverted-U-shaped bracket having an apex contacting and sliding along said top panel of said brace member, and having two prongs contacting and sliding along two side panels of said brace member.

3. A cord retainer as described in claim 2, wherein said securing means further comprises a screw-receiving hole formed in a prong of said inverted-U-shaped member, and a screw rotatable into said screw-receiving hole to contact and snugly fit against a side panel of said brace member.

4. A cord retainer as described in claim 2, wherein said securing means further comprises:
   a. a series of screw-receiving holes formed in a side panel of said brace member,
   b. a screw-receiving hole formed in a prong of said inverted-U-shaped member, and
   c. a screw rotatable into said screw-receiving hole of said inverted-U-shaped member and further rotatable into one of said holes formed in a side panel of said brace member to secure said movable inverted-L-shaped member in said chosen position.

5. A cord retainer as described in claim 2, wherein said securing means further comprises:
   a. a series of peg-receiving holes formed in a side panel of said brace member,
   b. a peg-receiving hole formed in a prong of said inverted-U-shaped member, and
   c. a peg insertable into said peg-receiving hole of said inverted-U-shaped member and further insertable into one of said holes formed in a side panel of said brace member to secure said movable inverted-L-shaped member in said chosen position.

6. A cord retainer as described in claim 2, wherein said securing means further comprises:
   a. a series of screw-receiving holes formed in said top panel of said brace member,
   b. a screw-receiving hole formed in said apex of said inverted-U-shaped member, and
   c. a screw rotatable into said screw-receiving hole of said inverted-U-shaped member and further rotatable into one of said holes formed in said top panel of said brace member to secure said movable inverted-L-shaped member in said chosen position.

7. A cord retainer as described in claim 2, wherein said securing means further comprises:
   a. a series of peg-receiving holes formed in said top panel of said brace member,
   b. a peg-receiving hole formed in said apex of said inverted-U-shaped member, and
   c. a peg insertable into said peg-receiving hole of said inverted-U-shaped member and further insertable into one of said holes formed in said top panel of said brace member to secure said movable inverted-L-shaped member in said chosen position.

8. A cord retainer as described in claim 1, wherein a vertical length of said substantially vertical leg of said fixed inverted-L-shaped member is longer than a horizontal length of said substantially horizontal leg of said fixed inverted-L-shaped member.

9. Method of retaining a cord within a box, comprising the steps of:

a. connecting a brace member to a bottom panel of said box,
b. connecting a fixed inverted-L-shaped member to said brace member, said fixed inverted-L-shaped member having two legs substantially at right angles to each other, so that a substantially vertical leg extends upwards from said brace member, and a substantially horizontal leg extends outward from said substantially vertical leg in a fixed direction,
c. slideably connecting a movable inverted-L-shaped member to said brace member, said movable inverted-L-shaped member having two movable legs substantially at right angles to each other, so that a substantially vertical movable leg extends upwards from said brace member, and a substantially horizontal movable leg extends outward from said substantially vertical movable leg, in a direction opposite said fixed direction, p1
d. securing said movable inverted-L-shaped member in a chosen position on said brace member, and
e. winding said cord around said fixed inverted-L-shaped member and said movable inverted-L-shaped member.

* * * * *